(12) United States Patent
Goffhé et al.

(10) Patent No.: US 7,357,581 B2
(45) Date of Patent: Apr. 15, 2008

(54) FIBRE OPTIC TRANSCEIVER

(75) Inventors: Fredrik Goffhé, Stockholm (SE); Lars Lindberg, Stockholm (SE); Bertil Kronlund, Varmdö (SE)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/539,740

(22) PCT Filed: Dec. 11, 2003

(86) PCT No.: PCT/SE03/01936

§ 371 (c)(1),
(2), (4) Date: Jun. 8, 2006

(87) PCT Pub. No.: WO2004/055562

PCT Pub. Date: Jul. 1, 2004

(65) Prior Publication Data

US 2006/0239622 A1    Oct. 26, 2006

(30) Foreign Application Priority Data

Dec. 18, 2002  (SE) .................................. 0203790
Dec. 18, 2002  (SE) .................................. 0203791

(51) Int. Cl.
*G02B 6/36* (2006.01)
*H04B 10/00* (2006.01)

(52) U.S. Cl. .................. 385/92; 398/135; 398/138; 398/139

(58) Field of Classification Search ................ 398/135, 398/138, 139
See application file for complete search history.

(56) References Cited

U.S. PATENT DOCUMENTS

| | | | |
|---|---|---|---|
| 5,901,263 A | | 5/1999 | Gaio et al. |
| 6,371,787 B1 * | | 4/2002 | Branch et al. ............... 439/352 |
| 6,942,395 B1 * | | 9/2005 | Chuan et al. .................. 385/53 |
| 2002/0167793 A1 * | | 11/2002 | Branch et al. ............... 361/686 |

* cited by examiner

*Primary Examiner*—Michelle Connelly-Cushwa
*Assistant Examiner*—Chris H. Chu
(74) *Attorney, Agent, or Firm*—Workman Nydegger

(57) ABSTRACT

A transceiver for use in a fiber optic transmission system is described, which transceiver (1) is adapted for insertion into an opening in a holder (6) along a direction of insertion. The transceiver comprises blocking means (2) which may be moved between a blocking position in which the transceiver (1) is prevented from being pulled out from the holder (6) and a non-blocking position in which the transceiver (1) may be pulled out from the holder. The transceiver (1) also comprises a front member (8) which may be translated between a pulled out position and an inserted position for moving the blocking means.

17 Claims, 9 Drawing Sheets

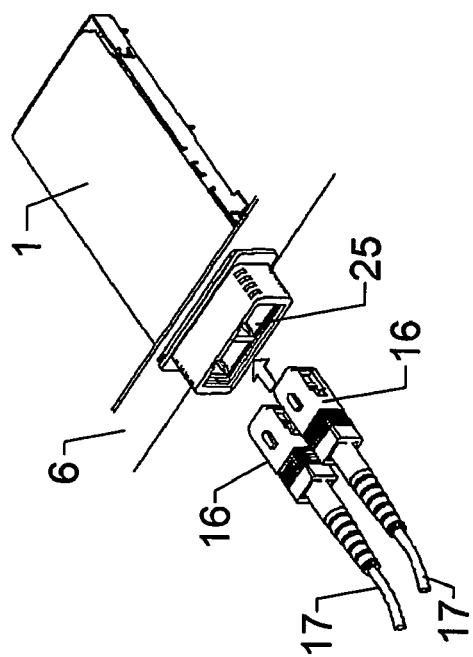
Fig. 5c
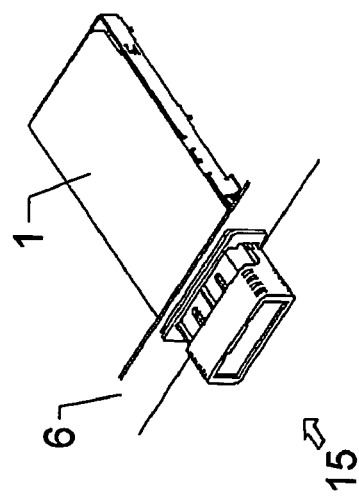
Fig. 5b
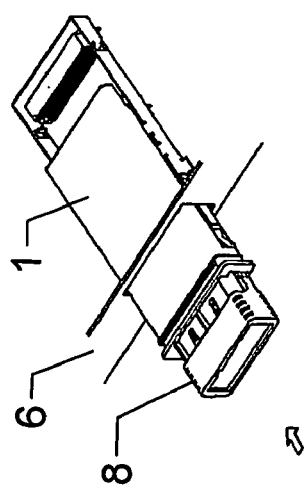
Fig. 5a1
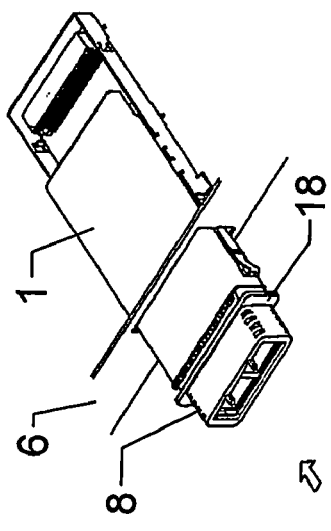
Fig. 5a2

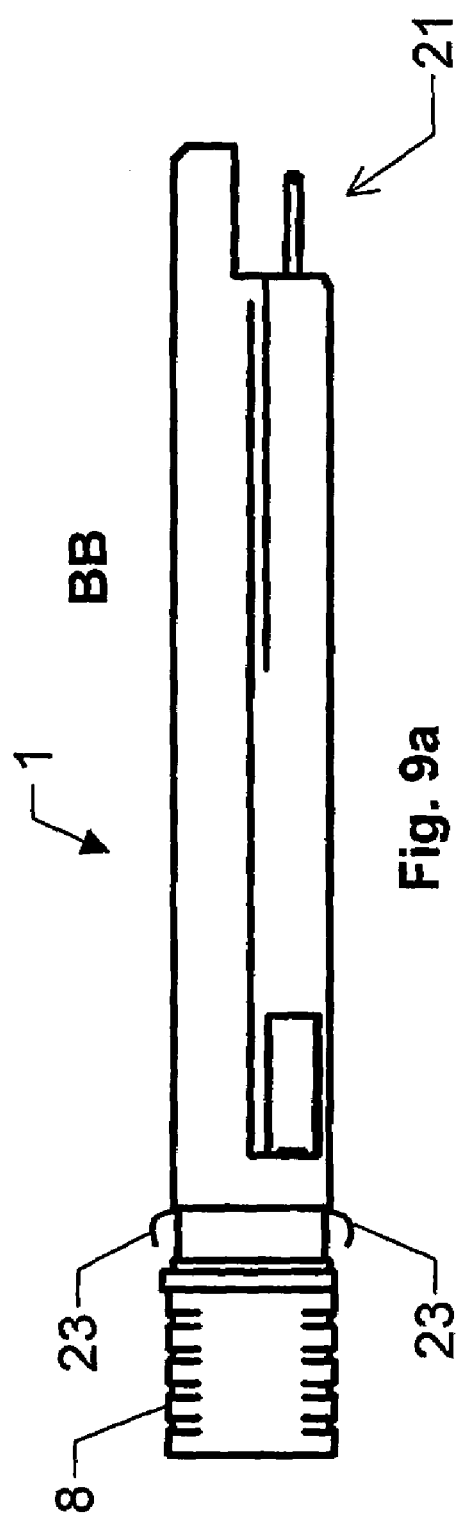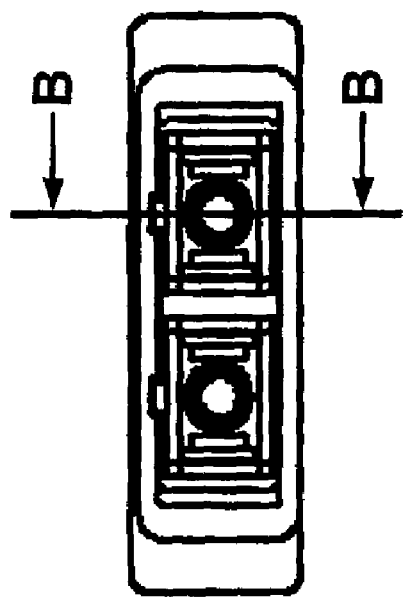

FIBRE OPTIC TRANSCEIVER

TECHNICAL FIELD

The present invention relates to a fibre optic transceiver and particularly to such a transceiver that is arranged for insertion in an opening in a holder. The invention also relates to a use of the transceiver and to a fastening device for such a device.

DESCRIPTION OF THE PRIOR ART

The use of optical fibres for transmission of information between data processing systems has become increasingly used, due to its capability of wide bandwidth transmission of information. The optical fibres that are used for transmission of information are connected to electro-optical transceivers in both ends. The transceivers are in turn connected to computers in which they are usually inserted in an opening of the data processing system, which opening usually is named port.

The transceiver is secured in place in the opening or port of the data processing system by a latching system so that it cannot be removed from the opening or port without first disconnecting the latching system. It would be desirable to have a transceiver for a fibre optical transmission system that may easily be inserted into and locked in an opening in the data processing system.

Transceivers of the kind described above are often to be placed in locations where it may be cumbersome to reach them and it is therefore desirable that they are easily maneuvered with only one hand.

In U.S. Pat. No. 5,901,263 a lockable optical fibre link module is described. The module has a resilient latch which has a secured and an unsecured position and a locking bail which is rotatably arranged on the front of the module to thereby move the resilient latch between the secured and the unsecured position.

Even though the module described in said US patent provides easy handling in most circumstances it may still be cumbersome for an operator of the switch to maneuvere the latch and to insert or remove the module from the computer.

Thus there is a need for an alternative to the prior art electro-optical fibre transceiver, which may easily be inserted into or removed from an opening or a port in a data processing system.

SUMMARY OF THE INVENTION

An object of the present invention is to provide an optical transceiver that may easily be inserted into or removed from an opening in a holder while simultaneously providing possibilities to lock the transceiver in the inserted position in the opening.

Another object of the present invention is to provide an optical transceiver which may only be removed from a holder when it is disconnected from any optical fibre.

Still another object of the present invention is to provide an optical transceiver which may be removed from a holder in a single motion using only one hand.

Yet another object of the present invention is to provide a locking device for an optical transceiver on which locking device the transceiver may be arranged.

At least one of these objects is achieved with a transceiver, a locking device or a use according to the independent claims.

Further features and advantages of the invention are evident from the dependent claims.

A transceiver for use in a fibre optic transmission system according to the present invention is adapted for insertion into an opening in a holder along a direction of insertion. The opening essentially defines a plane to which the direction of insertion is essentially perpendicular. The transceiver includes at least one blocking means which may be moved between a blocking position in which the transceiver is prevented from being pulled out from the holder and a non-blocking position in which the transceiver may be pulled out from the holder. The transceiver is characterised in that the transceiver also comprises a front member which may be translated between a pulled out position and an inserted position. The blocking means is effected by the front member to be in the blocking position when the front member is in its inserted position and effected by the front member to resiliently move to its non-blocking position when the front member is moved to its pulled out position.

With a transceiver according to the invention it is uncomplicated for a person to insert and remove the transceiver from a holder even if the transceiver is positioned in a place where it is difficult to reach it. If one wants to remove the transceiver one only has to continue the motion used when releasing the blocking means, i.e. to continue pulling the front member backwards.

It is advantageous for the blocking means to be arranged to move essentially perpendicular to the direction of insertion when the front member is moved to its inserted position. By having the blocking means arranged in this way they may interact with the holder as quick as possible without any unnecessary motion.

The blocking means may comprise at least one detent which is arranged to interact with the holder. This is a straight-forward solution. The blocking means may however also be blocking means which rely only on friction between the blocking means and the holder.

Said at least one detent may be arranged so that it is possible to insert the transceiver in the opening when the front member is in its inserted position. This may be achieved by having a resilient detent which is provided with a front edge, which is arranged towards the holder during insertion and which forms an acute angle with the direction of insertion.

The blocking means may comprise at least two detents arranged on opposite sides of the transceiver. This makes the blocking means stronger and makes it easier to prevent the transceiver from moving from the inserted position. There may of course be any other number of detents arranged on the transceiver.

The at least one detent may be spring tensioned inwards towards the transceiver with a spring acting on the detent. The spring may be either a pulling spring or a pushing spring. Alternatively the detent may itself be a spring as will be described below.

The transceiver according to the invention may also comprise an optical fibre connector which is arranged such that an external optical fibre connector being connected to the optical fibre connector prevents the front member from entering its pulled out position. This is important for hot pluggable transceivers, as the transceiver must not be removed during operation. By having the optical fibre connector arranged so that it prevents the front member from entering its pulled out position and so that the removal of the external optical fibre connector turns off the transceiver, the aforementioned problem is avoided.

With a transceiver comprising an optical fibre connector the front member may comprise a sleeve, e.g. tube shaped, surrounding the optical fibre connector. This provides a front member which is robust and which may easily be gripped by a person desiring to remove the transceiver from the holder.

As mentioned above the blocking means may be resilient in itself. Such a blocking means may comprise at least one resilient arm which is fixed on a side of the transceiver at the end or the arm most distant from the opening when the transceiver is inserted into the holder.

The front member may comprise actuating pins which are arranged to be positioned between the transceiver and the resilient arm when the front member is in its inserted position to thereby force the resilient arm outwards from the transceiver. The actuating pins may of course also be arranged on the outside of the resilient arms, but by having them arranged on the inside they may be constructed with less mechanical strength as they may be supported from the inside by the transceiver itself.

The actuating pin may have a knob on the side facing the resilient arm and the resilient arm may have a corresponding bend such that when the front member is moved from the inserted position to the pulled out position the resilient arm has to move through a position more distant from the transceiver than it is when the front member is in its inserted position. By such an arrangement the front member is prevented from accidentally moving from the inserted position to the pulled-out position. Furthermore, a person operating the front member on the transceiver may easily feel when the front member is in the bottom position as this will be felt by the operator.

The front member may be translatable in a direction essentially parallel to the direction of insertion. By having the blocking means arranged in this way the motion for removing the transceiver becomes a natural continuation of the motion used to release the blocking means. There might of course be a small difference between the direction of the motion for releasing the blocking means and the motion used for removing the transceiver from the holder. Preferably, the difference in direction is less than 20 degrees and most preferred less than 10 degrees. The angle may, however, be as large as 45 degrees, while still achieving some advantages over the prior art.

As mentioned above the transceiver may be of the type usually denoted hot pluggable.

According to a second aspect of the present invention a transceiver according to the first aspect of the invention may be used in a data processing system.

According to a third aspect of the present invention a locking device for a transceiver in a fibre optic transmission system is provided. A transceiver may be arranged on the locking device, which locking device is adapted for insertion into an opening in a holder along a direction of insertion. The opening essentially defines a plane to which the direction of insertion is essentially perpendicular. The locking device comprises blocking means which may be moved between a blocking position in which the locking device is prevented from being pulled out from the holder and a non-blocking position in which the locking device may be pulled out from the holder. The locking device is characterized in that the locking device also comprises a front member which may be translated between a pulled out position and an inserted position. The blocking means is effected by the front member to be in the blocking position when the front member is in its inserted position and is effected by the front member to resiliently move to its non-blocking position when the front member is moved to its pulled out position. Such a locking device has the same advantages as the transceiver described above.

It goes without saying that the above described features of the invention naturally may be combined in the same embodiment.

In the following, preferred embodiments of the present invention will be described with reference to the appended drawings on which similar features are denoted with the same reference numerals.

BRIEF DESCRIPTION OF THE DRAWINGS

FIG. 9 shows in more detail a transceiver according to an embodiment of the present invention.

DETAILED DESCRIPTION OF THE INVENTION

Figure 1:
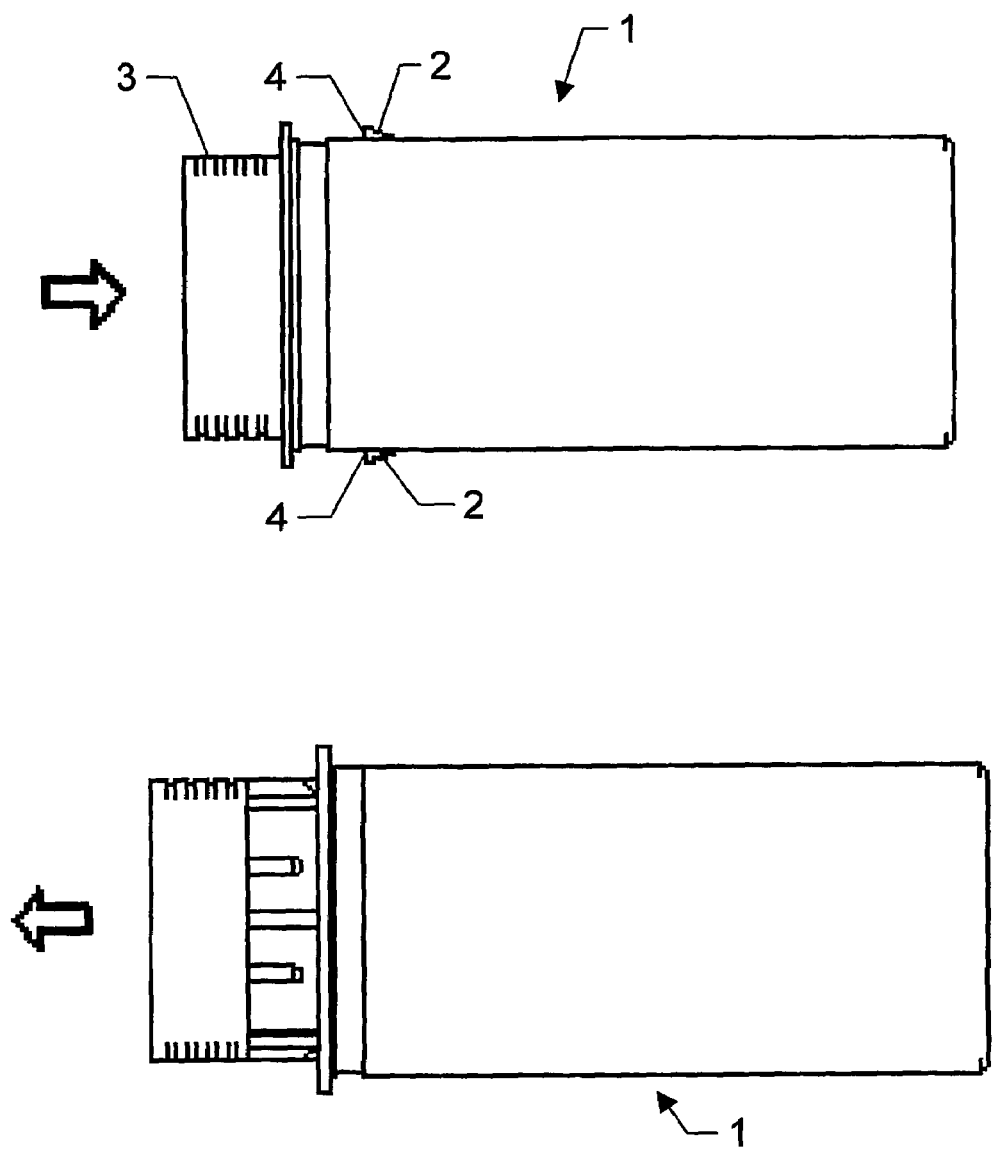
FIG. 1 illustrates schematically in a top view the function of the locking of a transceiver according to an embodiment of the invention.

A transceiver 1 according to a first embodiment of the present invention is schematically shown in FIG. 1. The transceiver 1 has blocking means 2 in the form of detents on opposite sides of the transceiver 1 and a front member 3 which is translatable in the direction of the arrows. FIG. 1 illustrates schematically in a top view the function of the transceiver when the front member 3 in its inserted position as shown in the top view in FIG. 1, and when the front member is in its pulled out position as shown in the bottom view in FIG. 1. When the front member 3 of the transceiver 1 is in its inserted position it actuates the detents 2 to their locking position as shown in the top view in FIG. 1. In their locking position the detents 2 prevent the transceiver from being pulled out from the holder due to the front edge 4 of the detents 2.

Figure 2:
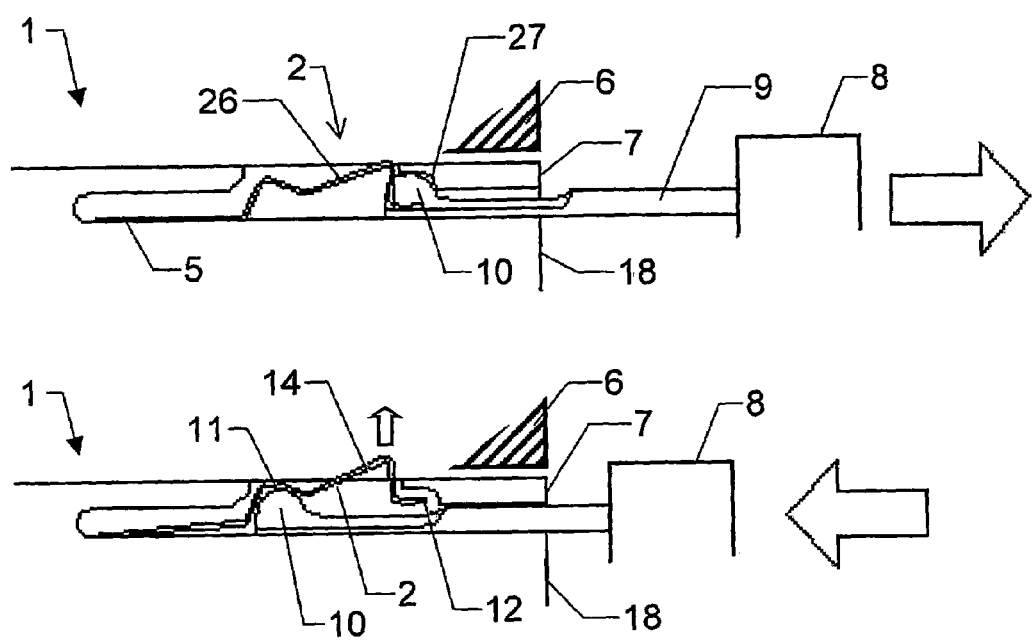
FIG. 2 illustrates schematically in a side view the function of the locking of a transceiver according to an embodiment of the invention.

FIG. 2 illustrates schematically in a side view the function of the locking of the transceiver 1 according to the invention, in a holder 6. The transceiver 1 has a resilient detent 2 in the form of a resilient arm 26 with a catch 27, which resilient arm 26 is fixed to the transceiver 1 in one of its ends 5. In the figure the resilient arm 26 is fixed in the end most distant from the front surface 7 of the holder 6. The front member 8 has an actuating pin 9 on which a knob 10 is arranged facing the resilient arm 26 and arranged between the transceiver 1 and the resilient arm 26. The transceiver has a stop member 12 which is arranged to prevent the non-fixed end of the resilient arm from moving outwards excessively from the transceiver. Furthermore, the resilient arm is bent to be adapted for receiving the knob 10 on the actuating pin 9.

When the front member is in its inserted position, as shown in the bottom view in FIG. 2, the knob 10 is engaging the bend 11 of the resilient arm 26. By the engagement of the resilient arm 26 the knob 10 on the actuating pin 9 forces the resilient arm 26 outwards from the transceiver 1. The resilient arm 26 will then prevent the transceiver 1 from being pulled out due to engagement with the holder 6. As shown in the figure, the resilient arm 26 has a front edge 14 which forms an acute angle with the direction of insertion. Due to the spring action and the acute angle of the front edge 14 the transceiver 1 may be inserted into the holder 6 also when the front member 8 is in its inserted position. However, as the resilient arm 26 has to bend during insertion of the transceiver into the holder with the front member in its inserted position, such an insertion requires a larger force compared with when the front member is in the pulled-out position. Nevertheless, in most applications, this is a highly desirable feature to indicate to a user that the transceiver will snap into a locked position after having been inserted.

When the front member 8 is in its pulled-out position, as shown in the top view in FIG. 2, the knob 10 on the actuating pin 9 does not actuate the resilient arm 26 which is in its non-blocking position. The resilient arm 26 moves to the position shown in the top figure through spring action. Further, when the front member 8 is moved from the inserted position to the pulled-out position the knob has to leave the bend in the resilient arm 26. As this requires the resilient arm 26 to move through a position where it is more bent, a force has to be applied to move the front member 8 from its inserted position to its pulled-out position. This also prevents the front member 8 from accidentally leaving the inserted position.

Figure 3:
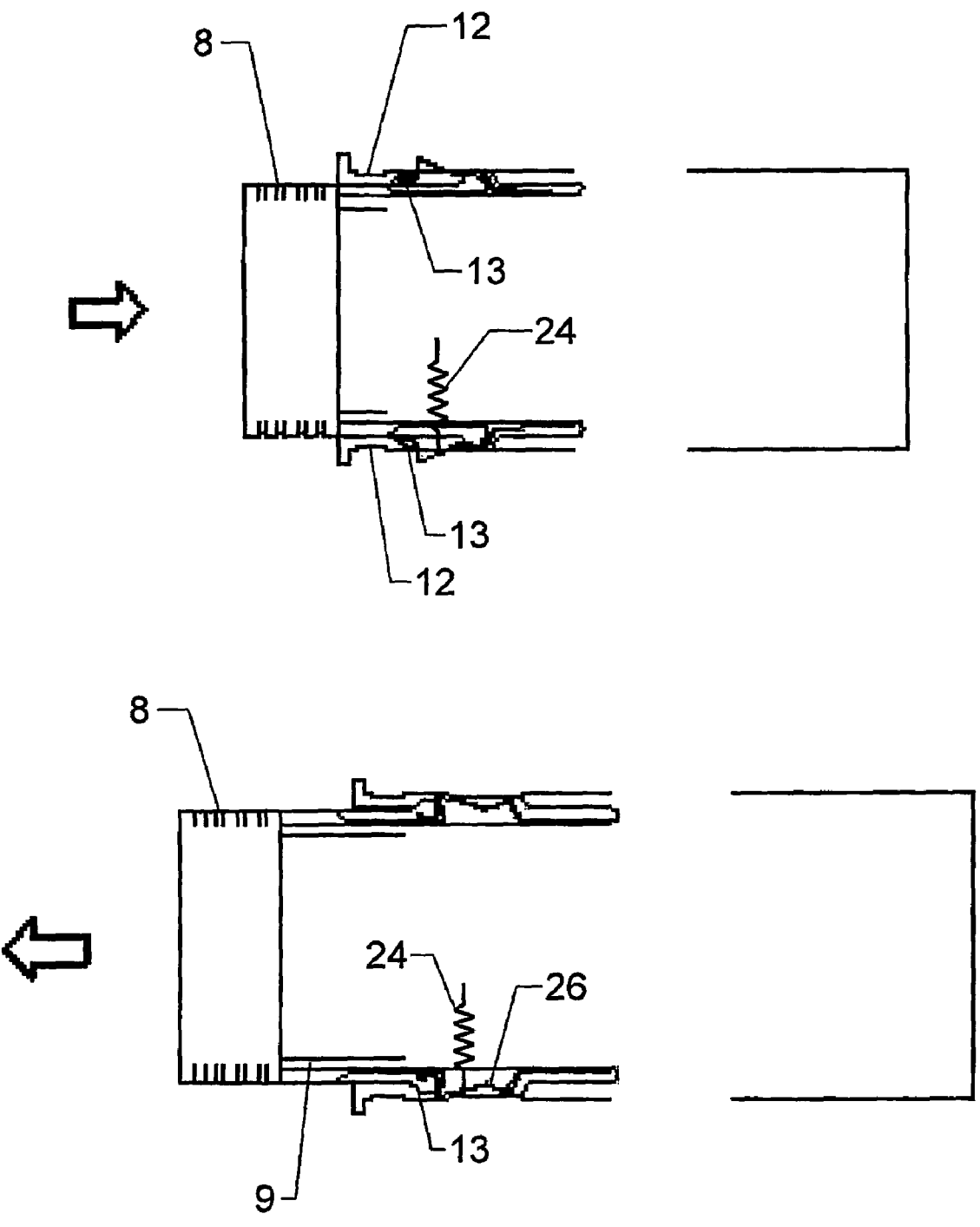
FIG. 3 illustrates schematically, in a cross-sectional top view, an embodiment of a transceiver according to an embodiment of the present invention.

FIG. 3 illustrates schematically, in a cross-sectional top view, an embodiment of a transceiver 1 according to the present invention. The transceiver 1 shown in FIG. 3 has the same features as described in connection with FIG. 2 and they are denoted with the same reference numerals as used in FIG. 2. In the top view the transceiver is shown with the front member 8 in its inserted position while in the bottom view the transceiver 1 is shown with the front member in its pulled-out position. As can be clearly seen in the bottom view in FIG. 3, the free ends 13 of the resilient arms 26 may partly be arranged above the actuating pins 9 of the front member when the front member 8 is in its pulled-out position. When the front member is in its inserted position the free ends 13 of the resilient arms 26 rest against the stop members 12. Also shown in FIG. 3 are springs 24 which force the arms towards the transceiver 1.

Figure 4:
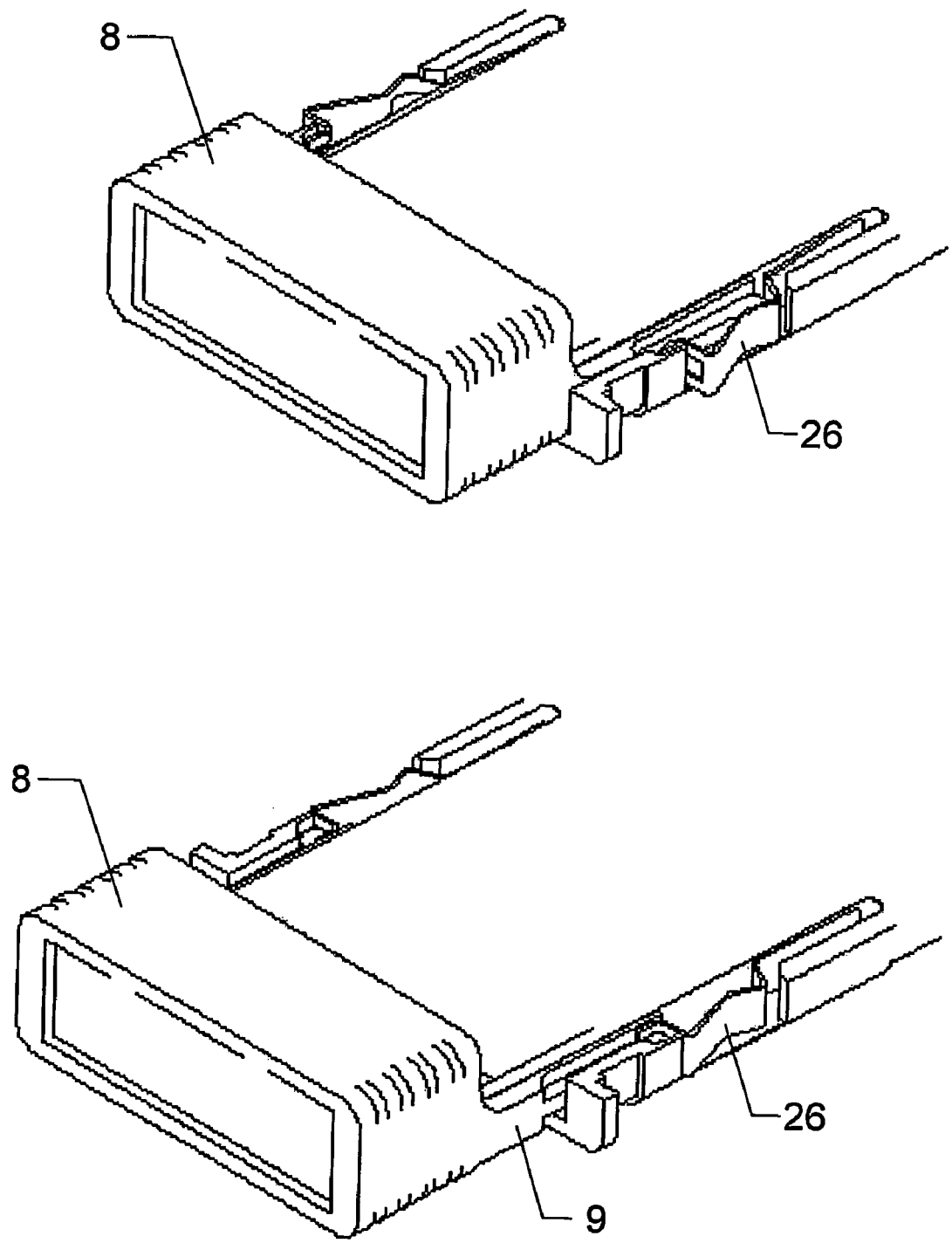
FIG. 4 illustrates schematically a different view of the embodiment shown in FIG. 3.

FIG. 4 shows another view of the transceiver 1 of FIG. 3. In this figure it is more clearly seen how the free end of the resilient arm 26 is above the actuating pin 9 of the front member 8. As in FIG. 3 the top view in FIG. 4 shows the transceiver when the front member 8 is in its inserted position while the bottom view in FIG. 4 shows the transceiver when the front member 8 is in its pulled-out position.

Figure 5B:
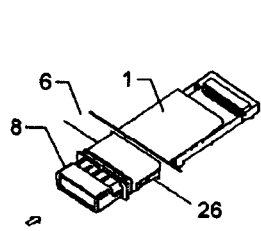
FIG. 5 illustrates schematically the maneuvering of a transceiver according to an embodiment of the present invention during insertion into a switch or a data processing device.
Figure 5B:
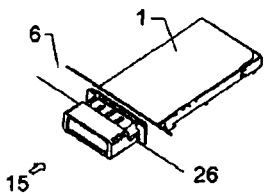
Figure 5C:
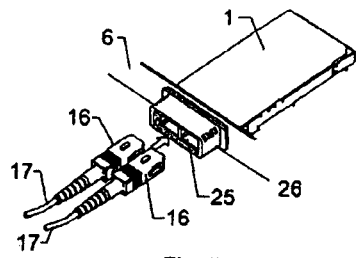
Figure 6A:
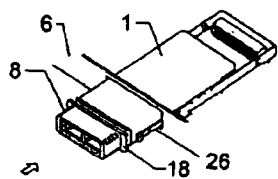
Figure 6A:
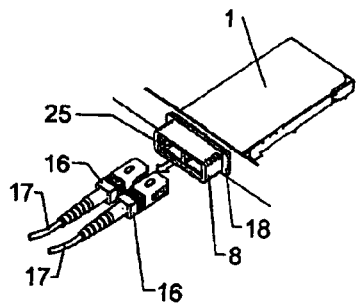
Figure 6B:
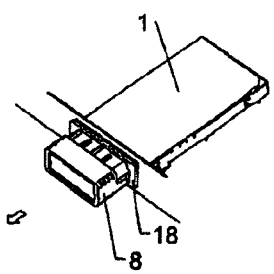
Figure 6C:
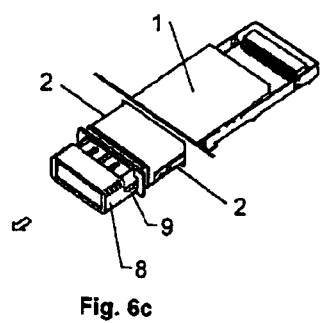

FIGS. 5a1, 5a2, 5b and 5c illustrate the function of the blocking means and the front member 8 in the transceiver 1 during insertion of the transceiver 1 in a holder 6. In FIG. 5a1 the front member 8 is in its pulled-out position and is partly inserted into an opening in a holder 6. As the front member 8 is in its pulled-out position the resilient arms 26 are in their non-blocking position and transceiver 1 may thus be inserted into the holder 6 without any effort. In FIG. 5a2 the front member 8 has been pushed forwards, and the transceiver 1 is partly inserted into an opening in a holder 6. As the front member 8 now is located proximate to the flange 18, the resilient arms 26 are in their blocking position. This means that the transceiver 1 may be inserted into the holder 6, however a larger force is required than in the situation shown described above with reference to FIG. 5a1. In FIG. 5b the transceiver 1 is shown fully inserted into the holder 6 but with the front member still in its pulled-out position. By inserting the front member 8 into the transceiver 1 in the direction of the arrow 15 the blocking means will move to their blocking position as has been described above. In FIG. 5c the insertion of an external optical fibre connector 16, to which optical fibres 17 are connected, into an optical fibre connector 25 of the transceiver 1 is illustrated.

As shown in FIG. 5 the front member 8 has the shape of a sleeve (or a tube) to which the actuating pins 9 are attached. By the front member 8 having a sleeve shape it is possible to insert an optical fibre connector into the transceiver 1 through the front member 8. Furthermore, a sleeve shaped front member is easy to grip. The attached figures show a sleeve shaped front member 8, which is associated with the advantageous feature of allowing external optical fibre connectors 16 to be attached when inserting the transceiver 1 in the holder 6, irrespective of the front member's position. However, according other embodiments of the invention the front member 8 may have alternative shapes, which likewise provide this advantageous feature. Namely, according to the invention, the front member 8 extends from a front-end side of the transceiver 1 along at least one plane substantially parallel to an insertion direction of an external optical fibre connector 16 of the transceiver 1, and the front member 8 is translatable in a direction essentially parallel to the direction of insertion of the transceiver 1 into the holder 6. Preferably, the front member 8 extends along at least two planes, which are substantially parallel to an insertion direction of an external optical fibre connector 16 to the transceiver 1, and which planes at least two planes are mutually parallel.

Figure 6C:
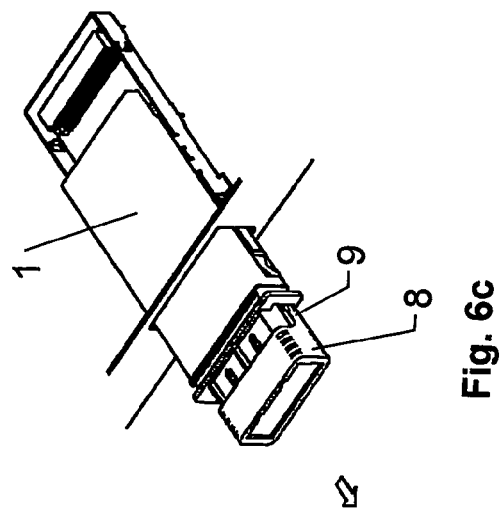
FIG. 6 illustrates schematically the maneuvering of the transceiver according to an embodiment of the present invention during removal from a switch or a data processing device.
Figure 6B:
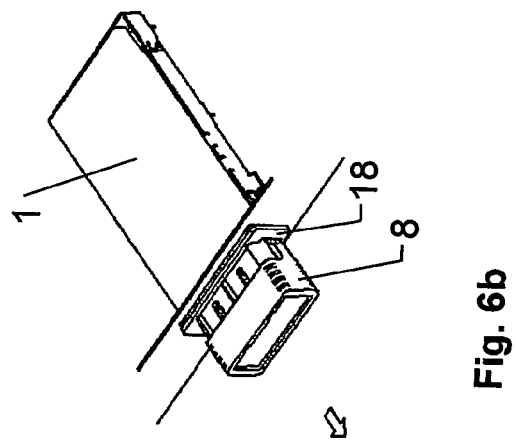
Figure 6A:
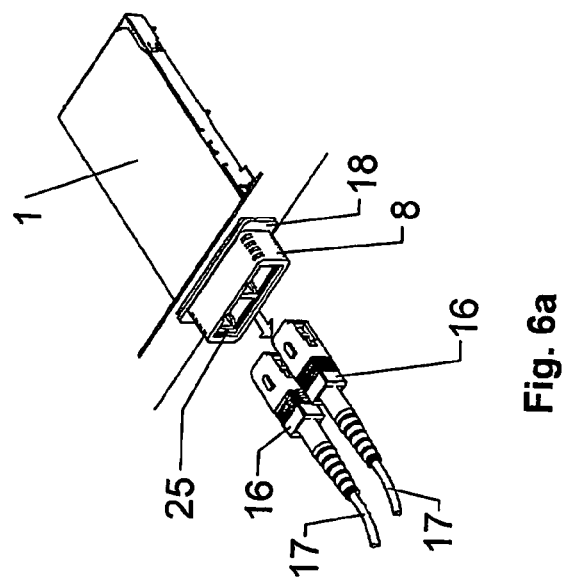

FIG. 6a illustrates the removal of the external optical fibre connector 16 from the transceiver 1. When the external optical fibre connector 16 has been removed from the transceiver 1 the front member may be pulled out to its pulled-out position as illustrated in FIG. 6b to move the blocking means to its non-blocking position. In FIG. 6c the transceiver is removed from the holder which is enabled by the blocking means 2 being in their non-blocking position.

FIG. 7 shows in larger scale the transceiver 1 in FIG. 5c with the external optical fibre connectors 16 attached to the transceiver 1 inserted into the holder 6. By inserting an optical fibre connector 16 into the transceiver 1 the front member 8 is prevented from being pulled out to its pulled-out position. This is preferably accomplished by means of at least one interlocker 30, which each is actuated by the optical fibre connector 16, such that the interlocker 30 snaps into a locking position in the front member 8 when the connector 16 is inserted into the optical fibre connector 25.

FIG. 8 shows two different views of the optical transceiver 1 according to an embodiment of the present invention. The same reference numerals as have been used in the other figures will be used also in FIG. 8. The rear part 21 of the transceiver 1 is the part of the transceiver that is first inserted into the holder. Close to the flange 18 an electromagnetic shield is arranged. The shield has the form of a sealing flange 23 which extends from the transceiver around the part that is supposed to face the holder 6.

FIG. 9*b* displays the transceiver from the side into which an optical fibre connector is to be inserted. A sectional view along the section B-B over the sealing flange 23 is shown in FIG. 9*a*. The electromagnetic shield is shown as the sealing flange 23 extending from the transceiver towards the flange of the transceiver. The flange 23 extends around the entire transceiver 1.

The flange 23 does not necessarily have to extend towards the front member 18 (as illustrated in FIG. 9*a*), but may instead extend in a direction towards the rear part 21 of the transceiver 1.

The embodiments described above may of course be varied in many ways without departing from the scope of the present invention which is limited only by the appended claims.

The invention claimed is:

1. Transceiver (1) for use in a fibre optic transmission system, which is adapted for insertion into an opening in a holder (6) along a direction of insertion, which opening essentially defines a plane to which the direction of insertion is essentially perpendicular, which transceiver comprises blocking means (2) which may be moved between a blocking position in which the transceiver (1) is prevented from being pulled out from the holder (6) and a non-blocking position in which the transceiver (1) may be pulled out from the holder (6), the blocking means comprising at least two detents arranged on opposite respective sides of the transceiver, the transceiver (1) further comprising a front member (8) which may be translated between a pulled out position and an inserted position, wherein the blocking means (2) is effected by the front member (8) to be in the blocking position when the front member (8) is in its inserted position and effected by the front member (8) to resiliently move to its non-blocking position when the front member (8) is moved to its pulled out position, and the transceiver also comprising means for preventing the transceiver from being inserted too far into the holder.

2. Transceiver according to claim 1, wherein said at least two detents are arranged so that it is possible to insert the transceiver (1) in the opening when the front member (8) is in its inserted position.

3. Transceiver according to claim 2, wherein said at least two detents have such a shape that they provide a resilient profile towards the holder (6).

4. Transceiver according to claim 3, wherein the blocking means (2) is arranged to move essentially perpendicular to the direction of insertion when the front member (8) is moved to its inserted position.

5. Transceiver according to claim 4, wherein the detent is resilient and provided with a front edge (14), which is arranged towards the holder (6) during insertion and which forms an acute angle with the direction of insertion.

6. Transceiver according to claim 4, wherein the at least one detent is spring tensioned inwards towards the transceiver (1) with a spring (24) acting on the detent.

7. Transceiver according to claim 1, comprising an optical fibre connector (25).

8. Transceiver according to claim 7, wherein the optical fibre connector (16) is arranged such that an external optical fibre connector (16) being connected to the optical fibre connector (16) prevents the front member (8) from entering its pulled out position.

9. Transceiver according to claim 7, wherein the front member (8) extends from a front-end side of the transceiver (1) along at least one plane being substantially parallel to an insertion direction of an external optical fibre connector (16) to the transceiver (1).

10. Transceiver according to claim 7, wherein the front member (8) comprises a sleeve surrounding the optical fibre connector (25).

11. Transceiver according to claim 1, wherein the front member (8) comprises at least one actuating pin (9) for actuating the blocking means (2).

12. Transceiver according to claim 1, wherein the blocking means (2) comprises at least one resilient arm (26) which is fixed on a side of the transceiver (1) at its end most distant from the opening when inserted into the holder (6).

13. Transceiver according to claim 12, wherein the front member (8) comprises at least one actuating pin (9) which is arranged to be between the transceiver (1) and the resilient arm (26) when the front member (8) is in its inserted position to thereby force the resilient arm (26) outwards from the transceiver (1).

14. Transceiver according to claim 13, wherein the actuating pin (9) has a knob (10) on the side facing the resilient arm (26) and the resilient arm (26) has a corresponding bend such that when the front member (8) is moved from the inserted position to the pulled out position the resilient arm (26) has to move through a position more distant from the transceiver (1) than it is when the front member (8) is in its inserted position.

15. Transceiver according to claim 1, wherein the front member (8) is translatable in a direction essentially parallel to the direction of insertion.

16. Transceiver according to claim 1, wherein the transceiver (1) is hot pluggable.

17. Use of a transceiver according to claim 1 in a data transmission system.

* * * * *

UNITED STATES PATENT AND TRADEMARK OFFICE
CERTIFICATE OF CORRECTION

PATENT NO. : 7,357,581 B2  Page 1 of 3
APPLICATION NO. : 10/539740
DATED : April 15, 2008
INVENTOR(S) : Goffhé et al.

It is certified that error appears in the above-identified patent and that said Letters Patent is hereby corrected as shown below:

Drawings
Sheet 3, please replace Fig. 3 with the figure drawn below in which the transceiver 1 is labeled.

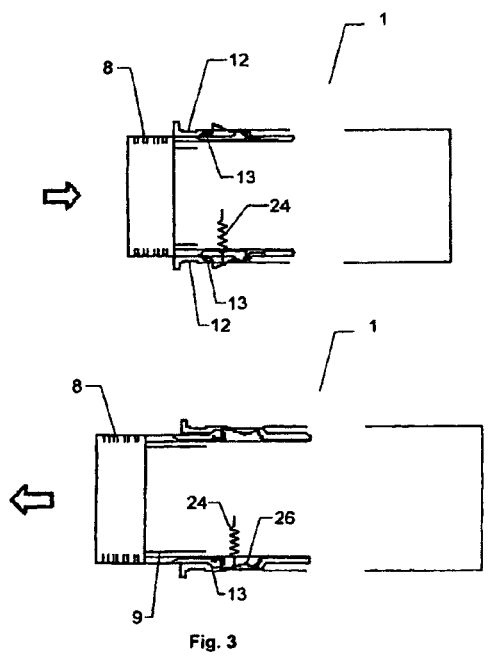

Fig. 3

Signed and Sealed this
Twenty-third Day of August, 2011

David J. Kappos
*Director of the United States Patent and Trademark Office*

Sheet 5, please replace Figs. 5a1-5c with the figures drawn below in which the resilient arms 26 are labeled.

Fig. 5a1

Fig. 5a2

Sheet 6, please replace Figs. 6a-6c with the figures drawn below in which the blocking means 2 in 6c is labeled.

CERTIFICATE OF CORRECTION (continued)
U.S. Pat. No. 7,357,581 B2

Sheet 8, please replace Figs. 8a-8b with the figures drawn below in which the holder 6 is labeled.

Figure 8A:
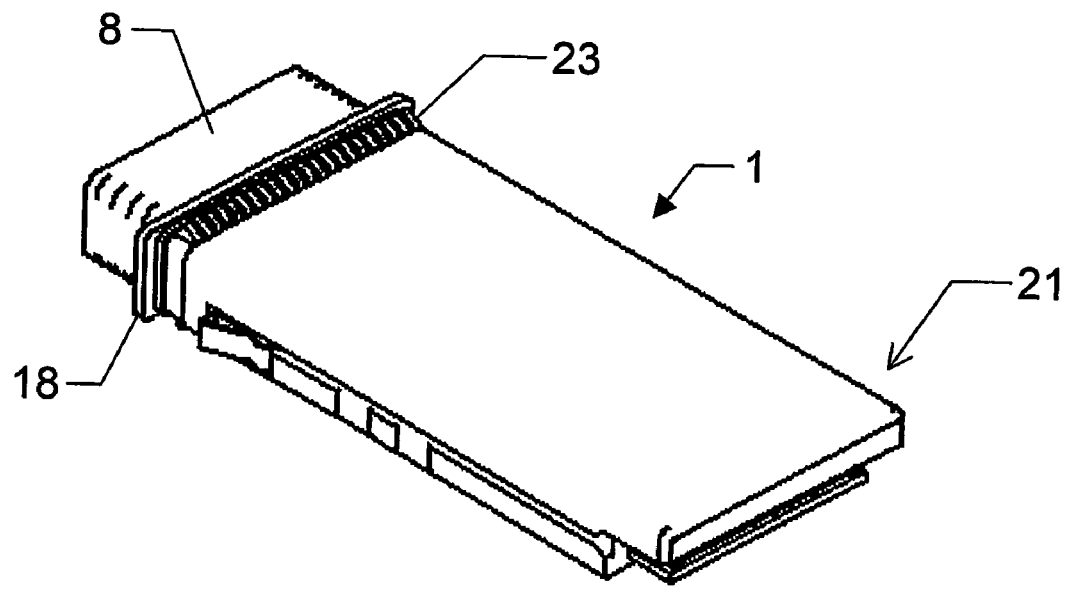
FIG. 8 shows in more detail a transceiver according to an embodiment of the present invention.

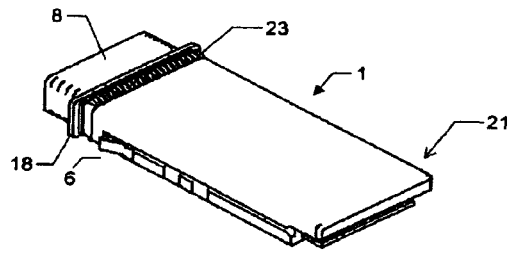
Fig. 8a

Figure 8B:
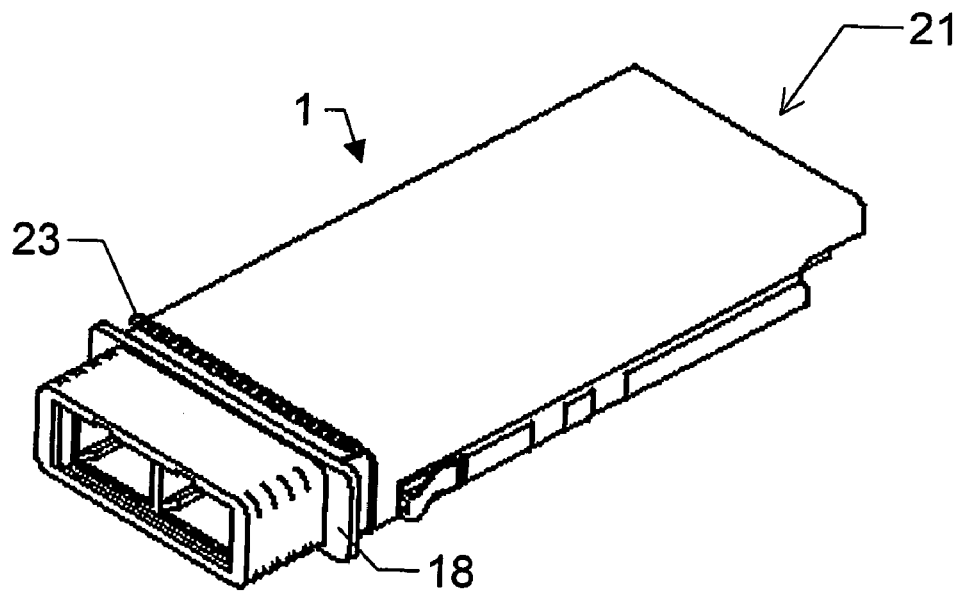

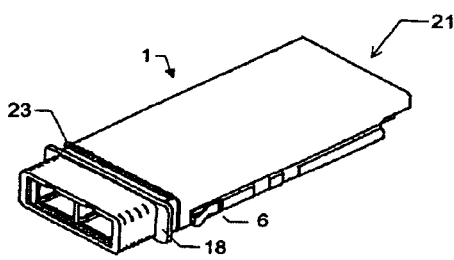
Fig. 8b

Figure 7A:
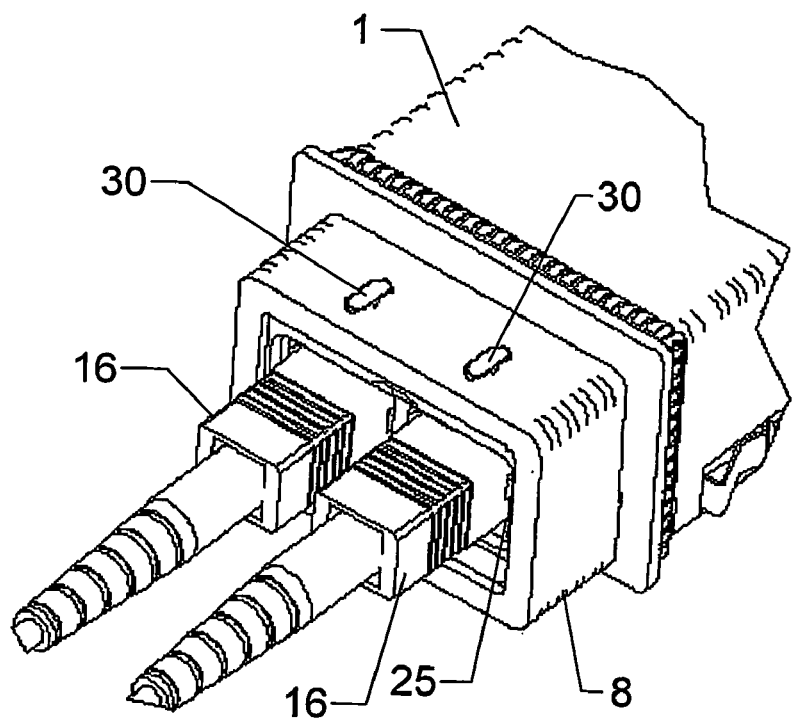
FIG. 7 shows schematically an embodiment of the front member on a transceiver according to an embodiment of the invention.
Figure 7B:
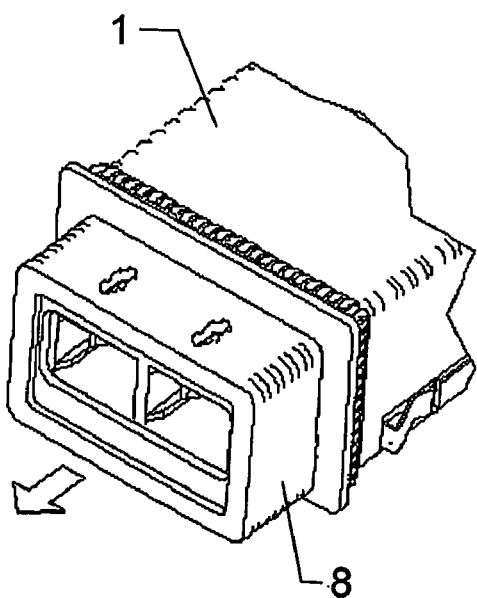

Column 4
Line 24, change "FIG 5" to --FIGS. 5A1-5C--
Line 28, change "FIG 6" to --FIGS. 6A-6C--
Line 32, change "FIG 7" to --FIGS. 7A-7B--
Line 35, change "FIG 8" to --FIGS. 8A-8B--
Line 37, change "FIG 9" to --FIGS. 9A-9B--

Column 5
Line 49, change "member" to --member 8--

Column 6
Line 18, change "9" to --9, FIG. 3--
Line 27, change "according other" to --according to other--

Column 7
Line 9, change "18" to --8--
Line 45, Claim 4, change "to 3" to --to Claim 3--